(12) United States Patent
Suk

(10) Patent No.: US 6,972,919 B2
(45) Date of Patent: Dec. 6, 2005

(54) INCREASING HEAD-DISK INTERFACE RELIABILITY USING CONTROLLED HEATING

(75) Inventor: Mike Suk, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 94 days.

(21) Appl. No.: 10/656,023

(22) Filed: Sep. 5, 2003

(65) Prior Publication Data

US 2005/0052773 A1    Mar. 10, 2005

(51) Int. Cl.[7] .............................................. G11B 21/02
(52) U.S. Cl. ....................................................... 360/75
(58) Field of Search .......................................... 360/75

(56) References Cited

U.S. PATENT DOCUMENTS

| | | | |
|---|---|---|---|
| 5,471,351 A * | 11/1995 | Ishiguro ...................... 360/53 |
| 5,825,577 A * | 10/1998 | Miyatake et al. ............. 360/75 |
| 5,838,514 A | 11/1998 | Smith et al. ................... 360/75 |
| 5,991,113 A | 11/1999 | Meyer et al. .................. 360/75 |
| 6,057,975 A | 5/2000 | Yaeger et al. ................. 360/75 |
| 6,577,466 B2 * | 6/2003 | Meyer et al. .................. 360/75 |
| 6,728,050 B2 * | 4/2004 | Wilson ......................... 360/31 |
| 6,748,038 B1 * | 6/2004 | McCall ....................... 375/345 |
| 2002/0097517 A1 | 7/2002 | Bonin et al. ................... 360/75 |
| 2003/0011932 A1 | 1/2003 | Mei et al. ................. 360/234.3 |
| 2004/0190175 A1 * | 9/2004 | Chey et al. .................... 360/59 |

* cited by examiner

*Primary Examiner*—David Hudspeth
*Assistant Examiner*—Mitchell Slavitt
(74) *Attorney, Agent, or Firm*—Zilka-Kotab, PC

(57) ABSTRACT

A method for increasing reliability during a read and/or write operation in a disk drive having a head. Data is read from a disk using a head. An amplitude of a signal obtained during reading the data is measured. A degree of variation in the signal amplitude is determined as a function of a position of the head relative to the disk. The head is selectively heated based on the variation in the signal amplitude for inducing protrusion of the head, thereby selectively reducing a fly height of the head for reducing variations of a read signal created by the head during a read operation and/or magnetic fields created by the head during a write operation.

32 Claims, 10 Drawing Sheets

INCREASING HEAD-DISK INTERFACE RELIABILITY USING CONTROLLED HEATING

FIELD OF THE INVENTION

The present invention relates to magnetic heads, and more particularly, this invention relates to creating controlled ABS protrusion for reducing fly height variations.

BACKGROUND OF THE INVENTION

In a disk drive, a magnetic recording head is made of read and write elements. The write element is used to record and erase data bits arranged in circular tracks on the disk while the read element plays back a recorded magnetic signal. The magnetic recording head is mounted on a slider which is connected to a suspension arm, the suspension arm urging the slider toward a magnetic storage disk. When the disk is rotated the slider flies above the surface of the disk on a cushion of air which is generated by the rotating disk.

The read element is generally made of a small stripe of multilayer magnetic thin films which have either magnetoresistance (MR) effect or giant magnetoresistance (GMR) effect, namely which changes resistance in response to a magnetic field change such as magnetic flux incursions (bits) from magnetic storage disk. Recorded data can be read from a magnetic medium because the external magnetic field from the recorded medium (the signal field) causes a change in the direction of magnetization in the read element, which in turn causes a change in resistance in the read element and a corresponding change in the sensed current or voltage.

FIGS. 1 and 2A–2C illustrate examples of a conventional composite type thin-film magnetic head 10. FIG. 1 is a cross-sectional view of the head 10 perpendicular to the plane of the air bearing surface (ABS). FIG. 2A shows the slider 11 flying above the disk 13.

In these figures, the reference numeral 12 denotes a substrate, 15 denotes an undercoating, 20 denotes a lower shield layer of the MR reproducing head part, 21 denotes an upper shield layer of the MR head part, which can also act as a lower pole of an inductive recording head part, 22 denotes a MR layer provided through an insulating layer 23 between the lower shield layer 20 and the upper shield layer 21, 26 denotes a write gap layer, 27 denotes a lower insulating layer deposited on the upper shield layer 21, 28 denotes a coil conductor formed on the lower insulating layer 27, 29 denotes an upper insulating layer deposited so as to cover the coil conductor 28, 30 denotes an upper pole, and 34 denotes a pad that would connect the read or write coil to other components in the drive. In general, there would be a plurality of pads 34 on the slider 11. Note that the pad 34 connects directly to the coil conductor 28. The upper pole 30 is magnetically connected with the lower pole (upper shield layer) 21 at its rear portion so as to constitute a magnetic yoke together with the lower pole 21.

As recording density and data transfer rate have increased over the past a few years, critical dimensions in the recording device such as track width read and write gap and coil size have decreased accordingly. Also, the fly height between the air bearing surface (ABS) 32 and the media have become smaller and smaller. For reference, recording heads with 40 gb/in$^2$ products typically have fly heights of about 12 nanometers. This fly height will continue to decrease in the future. This reduction in head critical dimensions and fly height, while beneficial to magnetic performance, also comes with cost on thermal and mechanic reliability.

The thermal expansion coefficients for the substrate and the various layers of the head differ, so when the head becomes heated during use, some layers will begin to protrude from the ABS. FIG. 2B depicts the head 10 when the write element is not operating, and particularly that the spacing may vary due to recession of various materials and structure due to the ABS fabrication process. FIG. 2C is a detailed diagram of the heat transfer and protrusion profile of the head 10 when the head is active (e.g., when the write coil is energized). One issue with heads is that the write-induced protrusion of the pole and overcoat can cause head-media contact, resulting in errors. This can affect the write head signal to noise ratio with alterations in the magnetic spacing between the head and the media. In older generations of heads, this was not a problem because the head was flying much higher and device size was bigger leading to easier heat dissipation. However, the coil length in modern heads has decreased to accommodate high data rate advancement. Consequently, ohmic heating from write current through coil and eddy current in write pole/yoke and magnetic hysteresis of magnetic materials are confined in a tiny space near the ABS, which typically lead to unacceptable thermal protrusion and drive reliability concerns. As can be seen in FIG. 2C, the top write pole 30 and overcoat protrude from the ABS 32 toward the media 13. The protrusion amount is typically 1–4 nanometers.

There are several factors that limit the reduction in slider flying height. These factors might reasonably be ignored at flying heights of above 20 nanometers, but would become major concerns at flying heights on the order of <10 nanometers. These include variations in the sliders themselves, variations in the structure that supports the sliders, and media surface roughness.

More particularly, normal tolerances in slider fabrication lead to structural variations among the sliders in any given batch. Consequently, the flying heights of sliders in the batch are distributed over a range, although the flying height of each slider individually is substantially constant.

Variations in supporting structures occur primarily in the transducer support arm, the suspension or gimballing structure, slider geometry and load arm. These variations influence the flying height, and the nature of a given slider's reaction to any disturbances, e.g. due to shock or vibration.

Disk roughness also becomes more of a problem at lower slider flying heights. To ensure that the head remains properly aligned with the data tracks, the disks must be securely attached to the spindle. Current practice is to separate the disks in the stack with spacer rings, and position a spacer ring on top of the disk/spacer stack. Then a top ring with several apertures is placed over the top spacer ring. The disks are bolted to the spindle via bolts extending through the apertures in the top ring. Great pressure must be exerted by the bolts on the top ring in order to prevent slippage of the disks in the event that the drive is bumped or uneven thermal expansion breaks the frictional coupling, because once the disks slip, the drive loses its servo and the data is lost.

A major drawback of the current practice is that when the bolts are tightened, the top ring and spacer become deformed due to the uneven pressures exerted by the individual bolts. Disks are typically formed from aluminum or glass. Aluminum is more easily deformed, so any external stress can cause deformations to the disk. Glass, too, will deform under uneven stress patterns. The deformation translates out to the disk, creating an uneven "wavy" disk surface, which is most prominent at the inner diameter of the disk. Any waviness on the disk surface can cause increase in the variation in the magnetic spacing.

Further, it has been found that stresses induced on the top disk in the stack transfer down into some or all of the remaining disks in the stack, causing the remaining disks in the drive to show similar unevenness.

Thus, the clearance between the slider and the disk is limited by the curvature of the disk, which is more pronounced towards the inner diameter due to clamping. To avoid interfering with the disk at the inner diameter, the slider is usually designed to fly higher to compensate for the curvature at the inner diameter of the disk. This curvature then translates into an increase in the magnetic signal variation.

One proposed design of a slider would drag on the disk surface, thereby more precisely fixing a head/disk spacing based on a peak roughness of the disk surface. Any improvement in setting the transducer/recording surface gap, however, would be at the cost of excessive wear to the slider, media recording surface, or both.

What is needed is a way to selectively reduce the spacing variation between the slider and disk surface, thereby reducing read and write signal variations caused by the varying fly height, and allowing the slider to be in close proximity to the media during reading and/or writing for allowing the heads to read and write with reduced track width, bit length and error rate.

SUMMARY OF THE INVENTION

The present invention overcomes the drawbacks and limitations described above by providing a method for increasing reliability during a read and/or write operation in a disk drive having a head via controlled protrusion. According to one embodiment, data is read from a disk using a head. An amplitude of a signal obtained during reading the data is measured. A degree of variation in the signal amplitude is determined as a function of a radial and/or angular position of the head relative to the disk. The head is selectively heated based on the variation in the signal amplitude for inducing protrusion of the head, thereby selectively reducing a fly height of the head for reducing variations of a read signal created by the head during a read operation and/or magnetic fields created by the head during a write operation. More particularly, the head is selectively heated to induce protrusion of the head to a selected fly height at a particular radial position of the head with respect to the disk (i.e., the position of the head in relation to the inner and/or outer diameter of the disk). The fly height can be selected based on an average fly height of the head over selected portions of the disk, i.e., the entire disk, the quarter of the disk closest to the inner diameter of the disk, the half of the disk closest to the outer diameter of the disk, etc.

Preferably, the selective heating corresponds to the variation of the amplitude of the signal at various radial positions relative to the disk. The degree of signal amplitude variation relates to variations in the fly height of the head over various portions of the disk. The signal amplitude variations can be determined using a modulation detector. The signal amplitude variations can also be determined by measuring a gain of the signal created by the head.

In one embodiment, more heating is performed when the head is positioned towards an inner diameter of the disk due to the waviness of the disk surface towards the inner diameter of the disk. In another embodiment, an extent of the heating (i.e., how much heat is applied) is varied based on the variation in the signal amplitude. In a further embodiment, the heating is constant during operation of the drive, where the protrusion is induced according to an extent of the heating.

According to another method for increasing reliability during a read and/or write operation in a disk drive having a head, height variations of a surface of the disk are mapped. The head is selectively heated at selected positions based on the disk surface height variations for inducing protrusion of the head, thereby selectively reducing the fly height of the head for reducing variations of a read signal created by the head during a read and/or write operation, and decreasing the magnetic spacing where needed. The disk height variations can be mapped using a modulation detector. The disk height variations can also be mapped by measuring a gain of a read signal created by the head. The disk height variations can also be mapped using a device that measures physical contours of the disk surface.

Further embodiments include disk drive systems implementing the methodology described herein.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art

Prior Art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
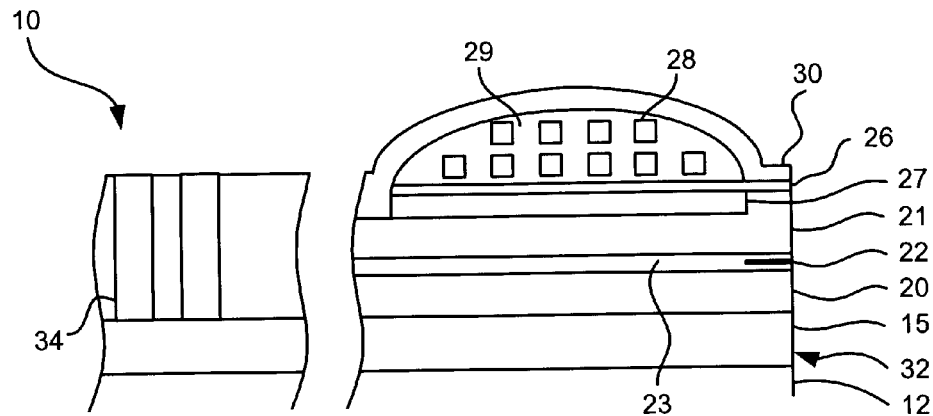
FIG. 1 is a cross-sectional view of a conventional composite type magnetic head, perpendicular to the plane of the ABS.
Figure 2A:
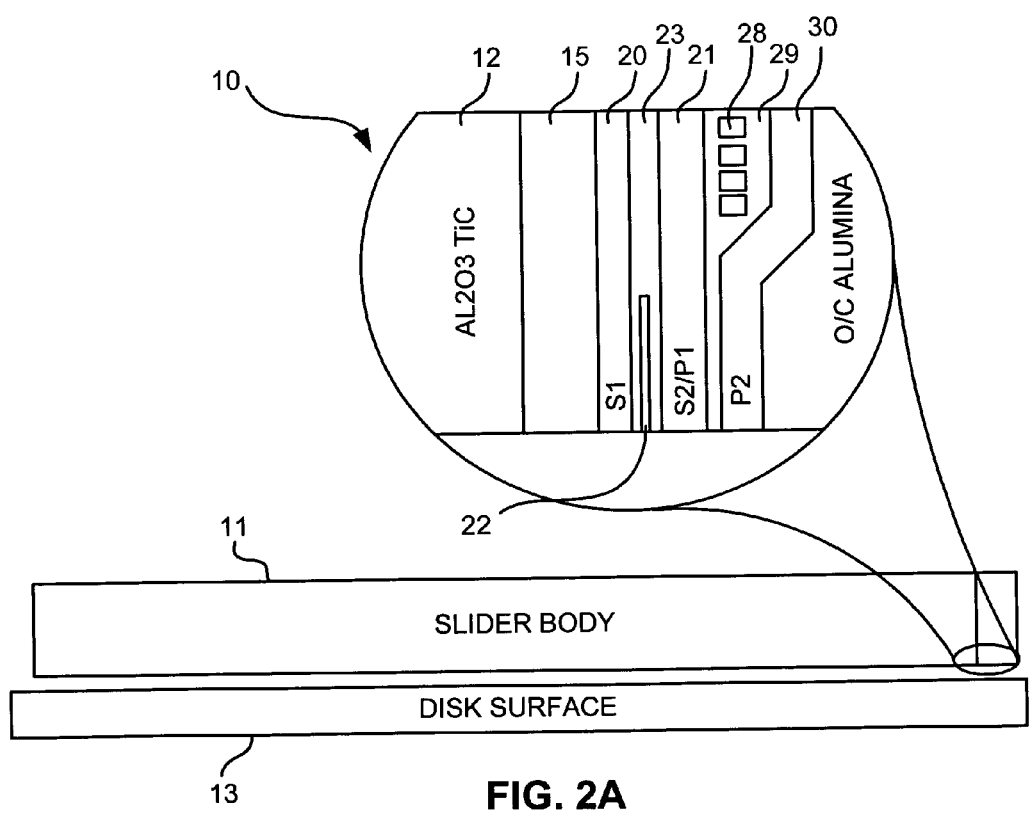
FIG. 2A shows a cold slider flying above the disk.
Figure 2B:
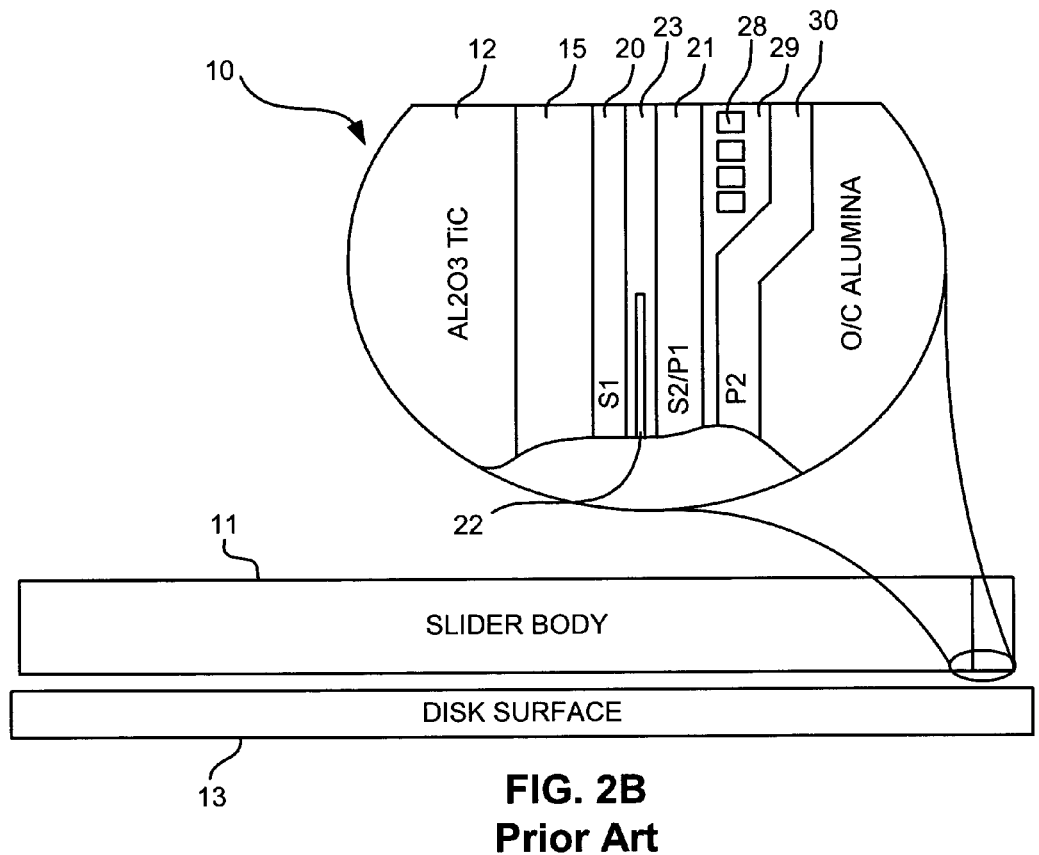
FIG. 2B depicts the discontinuity of a head caused by recession of various materials and structure due to the ABS fabrication process.
Figure 2C:
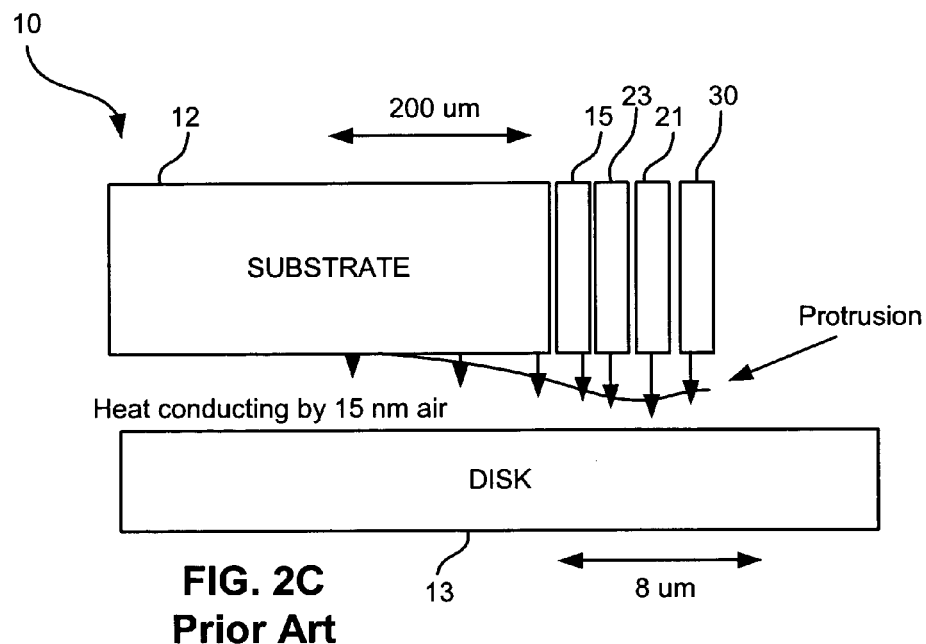
FIG. 2C is a detailed diagram of the heat transfer profile and protrusion profile of a head.
Figure 3:
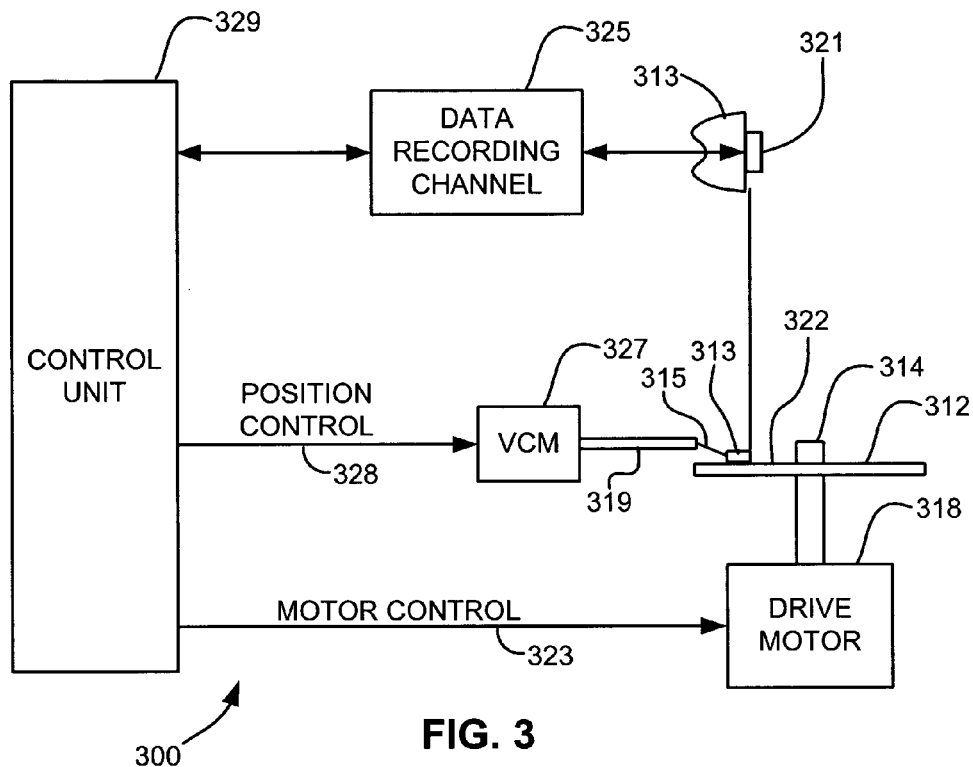
FIG. 3 is a simplified diagram of a magnetic disk drive system in accordance with one embodiment.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by means way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4:
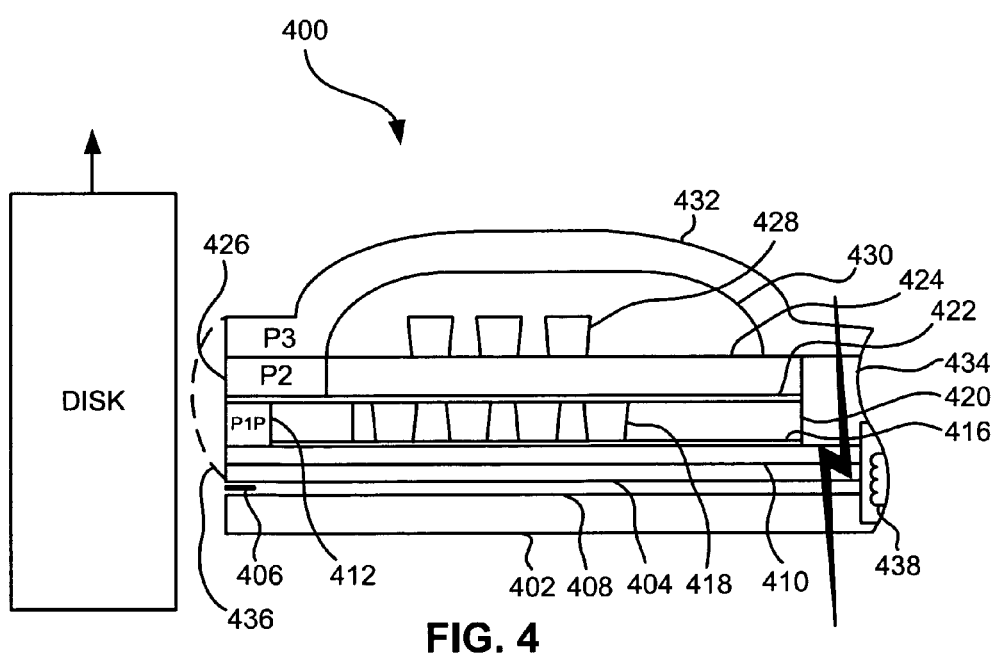
FIG. 4 is a partial cross sectional view of a head according to one embodiment.

FIG. 4 illustrates a partial cross section of a head 400 according to one embodiment. The head 400 shown in FIG. 4 and the examples below are formed by conventional processes and of conventional materials unless otherwise indicated. In FIG. 4, the reference numeral 402 denotes a lower shield layer (S1) of the MR reproducing head part, 404 denotes an upper shield layer (S2) of the MR head part, 406 denotes a MR layer provided through an insulating layer 408 between the lower shield layer 402 and the upper shield layer 404, 410 denotes a lower pole (P1) of an inductive recording head part, 412 denotes a P1 pole tip (P1P), 416 denotes a lower insulating layer deposited on the lower pole 410, 418 denotes a first coil conductor formed on the lower insulating layer 416, 420 denotes a first insulating layer deposited so as to cover the first coil conductor 418, 422 denotes a recording gap layer, 424 denotes an upper spacing layer positioned between above the recording gap layer 422, 426 denotes a second pole (P2), 428 denotes a second coil conductor formed on the upper insulating layer 424, 430 denotes a second insulating layer deposited so as to cover the second coil conductor 428, 432 denotes an upper pole (P3), and 438 denotes a heating element (heater) for inducing protrusion of the head 400. The upper pole 432 is magnetically connected with the lower pole 410 by a back gap 434 so as to constitute a magnetic yoke together with the lower pole 410. Note that other exemplary designs include a single coil conductor, P2 426 and P3 432 may be a continuous structure, additional layers may be added, the heating element 438 can be positioned at other locations, additional heating elements 438 can be implemented, etc.

The heat created by the heating element 438 causes the head 400 to exhibit thermal effects. Thermal effects include the natural tendency of materials to expand when heated, quantified by a temperature coefficient of thermal expansion more conveniently called a thermal expansion coefficient. Materials with higher coefficients expand more in response to a given temperature increase. When materials having different thermal expansion coefficients are contiguous and integral, their differing expansion when heated leads to elastic deformations and elastic restoring forces in both of the materials.

Thus, the heating element 438 induces thermal expansion. When the heating element 438 is energized, the surrounding materials are heated, causing them to expand according to their thermal expansion coefficients per unit power sent to the heating element 438. The expansion results in protrusion of at least a portion of the air bearing surface (ABS) of the head 400. The dashed line 436 of FIG. 4 illustrates protrusion of the ABS of the head 400.

As mentioned above, the surface of the media moves up and down with respect to the slider as the disk rotates. The present invention uses selective heating to reduce the spacing variation between heads and media heretofore inherent in disk drive systems. In other words, the present invention provides a method for compensating for the geometric effect of a wavy disk, thereby stabilizing the signal. Because the fly height is relatively constant, signal variations during read and/or write operations of the drive are reduced.

By inducing controlled thermal expansion or the protrusion effect, this allows the head design to fly at a higher physical spacing thereby reducing any head-disk interface issues, while reducing read and/or write signal variations which would otherwise be caused by fly height variations. The advantage of heating the head on demand to cause a protrusion is that it affects the magnetic spacing of the head. This in turn allows the head to fly at a higher physical spacing when the heating element 438 is not energized yet be in close proximity to the media during reading and/or writing. Thus, manufacturers can design the head so that the space between the ABS and disk media when the head is hot is known, allowing the designer to selectively reduce this space and obtain greater performance.

Figure 5:
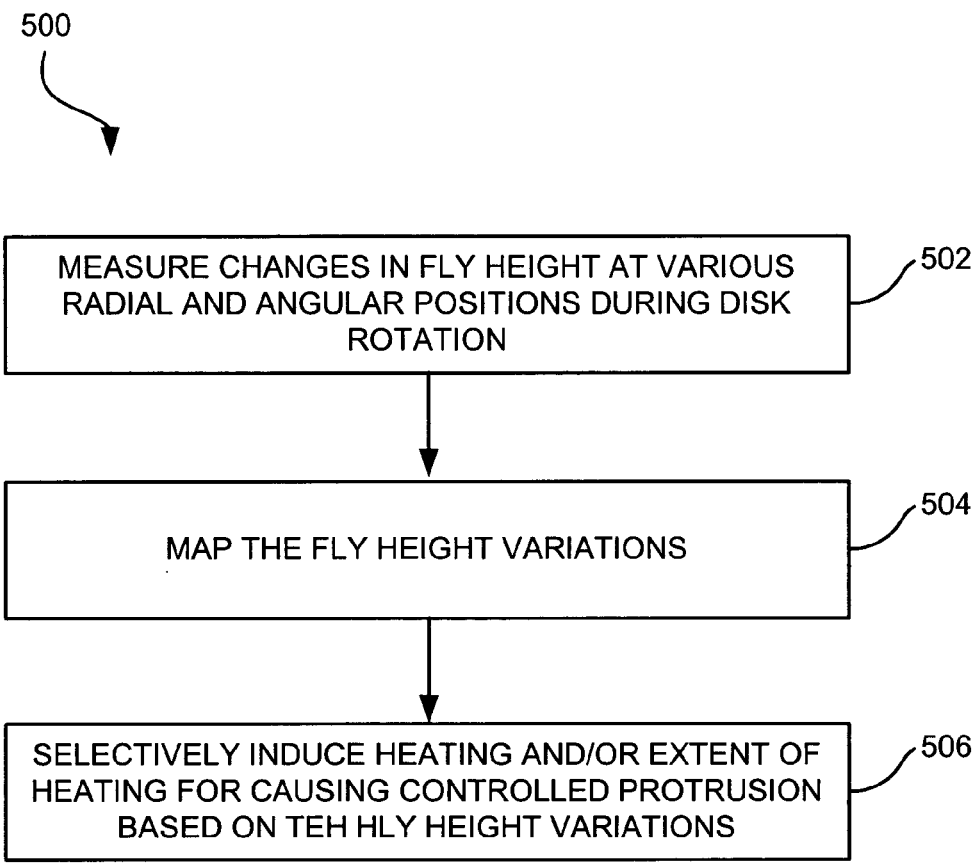
FIG. 5 is a flow diagram graphically depicting a method for reducing spacing variations between a head and the media surface, thereby increasing operating reliability of the drive according to one embodiment.

FIG. 5 depicts a general method 500 for reducing spacing variations between a head and the media surface by selectively induced protrusion for increasing operating reliability of the drive according to one embodiment. In operation 502, changes in fly height during disk rotation at various radial and angular positions are measured by methods described in more detail below. The fly height variations are mapped in operation 504 to indicate where the slider is flying higher and lower. At a particular radius and vector where the slider is flying higher, the slider is heated (and/or the amount of heating varied) so that the read and/or write element protrudes towards the disk to about a desired average fly height. Note operation 506. The result is a generally constant fly height over the wavy disk surface. Note that at some locations, the head may be close enough to the disk that heating is not necessary.

Figure 6:
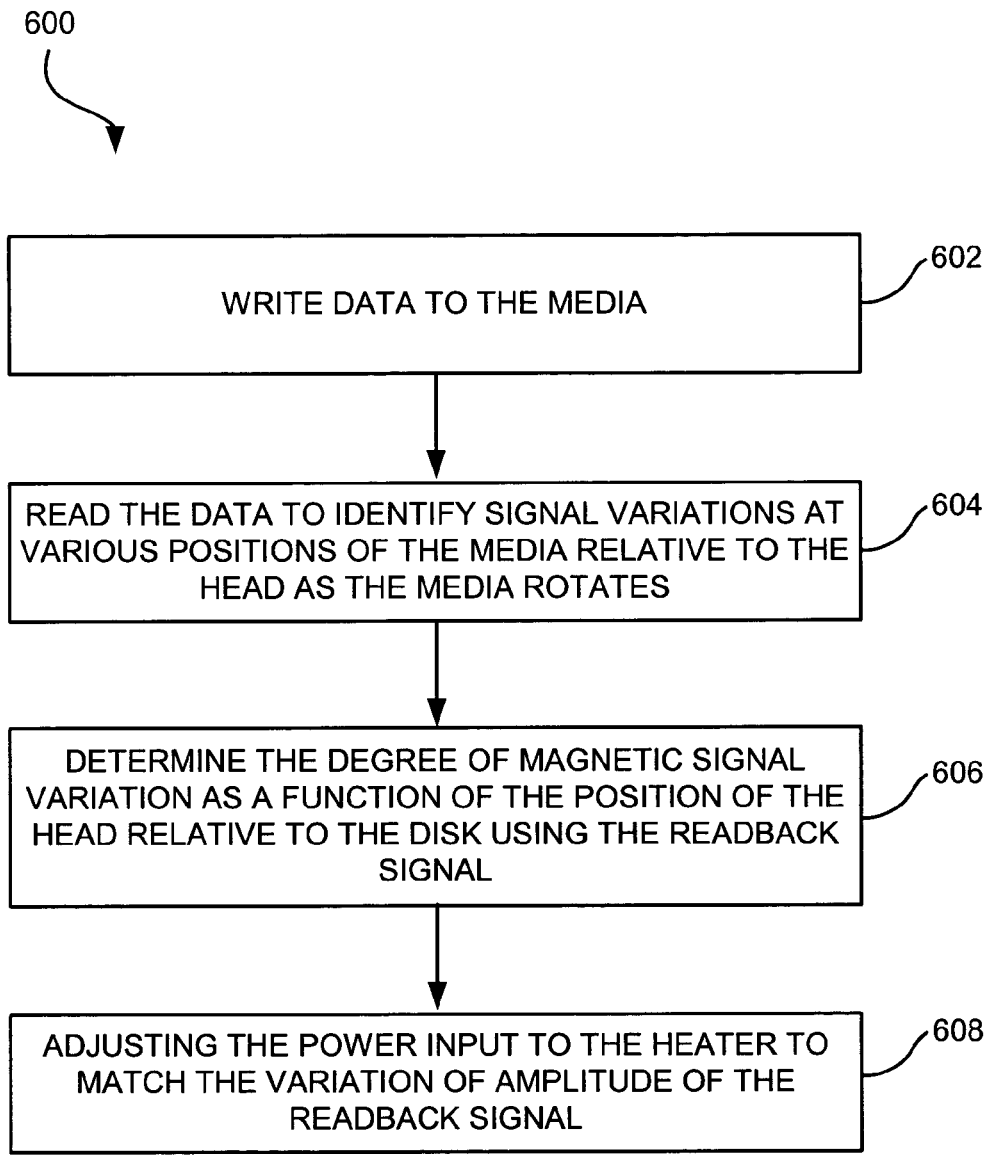
FIG. 6 is a flow diagram graphically depicting a method for reducing spacing variations between a head and the media surface, thereby increasing operating reliability of the drive according to another embodiment.

FIG. 6 graphically illustrates another method 600 for selective induction of protrusion. In operation 602, data is written to the media, preferably at a relatively low frequency. Any type of data may be written, though a repeating pattern is preferred to obtain consistent results. The data written to the media is read in operation 604 to determine variations in the readback signal, the signal variations corresponding to fly height variations. The signal variations need only be read once for a particular angular and radial position, since the variation is a very repeatable phenomenon that is related to the geometry of how the slider flies above the disk. In operation 606, the readback signal is used to determine the degree of magnetic signal variation as a function of the position of the head relative to the disk, i.e., the radial position of the head in relation to the media (i.e., the position of the head in relation to the inner and/or outer diameter of the disk) and angular position of the head in relation to the disk (i.e., the position on the disk under the head at a particular radial position). Based on the signal variation and positional data, the power input to the heater is applied and/or adjusted to match the variation of amplitude of the readback signal. Note operation 608. When this method is applied, the amplitude of the readback and/or write signal has minimal variation. This process can be used in drives sold to end consumers.

In one example of use, assume on two quarters of the disk, the slider flies 2 nm below an average fly height (average value), and on the other quarters of the disk it is flying 2 nm above the average value. The desired fly height is about 2 nm below the average value, so the higher fly heights are reduced to make them similar to the average of the lower fly heights. Protrusion is induced to cause the ABS of the head to protrude down by 3–4 nm over areas of the disk where the head is flying above the average value, so on average the fly height is about 1–2 nm below the average value all the way around the disk. The desired overall fly height is achieved.

A modulation detector can be used to measure the variations in the readback signal. Alternatively, automatic gain control (AGC) can be read to determine which areas of the disk need more gain. Areas that need higher gain are areas of higher fly heights, so protrusion is increased when the slider is above these areas. If a maximum gain signal is reached for certain areas, the head can be made to protrude down to a predetermined or an average gain value.

According to another method, the physical contours of the media surface are determined after drive build. For example, the readback signal can be used to identify and map the peaks and dips on the disk surface. Heating is then used to cause the head to protrude over the dips.

Preferably, a map is created, the map corresponding the readback signal variations and/or the fly height to particular positions on the media. The map is then used to determine timing of the heating.

It should be noted that the more protrusion that is induced, the greater the chance for mechanical contact between the slider and disk. Thus, the designer should consider this when determining the desired fly heights.

While the methodology presented above can be used in any type of head, a preferred structure includes materials that provide enhanced protrusion. In conventional processing, the insulation 420, 430 for the coils 418, 428 are constructed of a hard bake, which is a polymer such as baked novolac resist baked to a very high temperature until it has no more photoactive compounds. This cured resist becomes a good polymer insulator but has a low coefficient of thermal expansion relative to other polymers, but large relative to many oxides.

Rather than attempt to reduce protrusion, the present invention seeks to cause controlled expansion using materials with particular thermal expansion coefficients to create controlled protrusion to a known amount. To make the protrusion larger than a standard head width, a material that has a high thermal expansion coefficient is preferably used.

Accordingly, the present invention preferably incorporates materials with higher coefficients of thermal expansion than conventional materials. Such materials are operatively coupled to the yoke. By "operatively coupled" as used herein, what is meant is that the polymer layer is somehow coupled to the overall yoke structure via physical contact with the yoke itself, or by contact with other elements or combinations of elements that are ultimately in contact with the yoke or read head. Preferred materials include high thermal coefficient of expansion materials that are not completely cross linked or baked.

Preferred embodiments of the present invention include a high silicon-containing polymer for the insulating layers 420, 430 as opposed to a photoresist based polymer or other insulator, as is currently used in state of the art processes. The polymer used is heated but not completely cured, such that it creates a near-pure Si—O matrix. Such material has a large yet measurable coefficient of thermal expansion. The preferred material is a silsesquioxane, such as methylsilsesquioxane (MSSQ or MSQ), hydrogen silsesquioxane (HSQ), and other polymers containing a silsesquioxane segment. Another suitable material is hybrido-organo siloxane polymer (HOSP). The material can also be a partially cured photoresist.

For simplicity, the remaining description shall refer to use of MSSQ, it being understood that the various embodiments described herein may use any material having a higher coefficient of thermal expansion than traditional materials, including the aforementioned materials.

To completely transform MSSQ into a near-pure Si—O matrix would require a temperature of at least 400° C. However, a bake of thick MSSQ to less than about 225° C., and preferably below about 225° C. for 11 hours, will drive a cross-linking of the polymer sufficiently to make it insoluble in developer or hot n-methylpyrolidone (NMP) but will not completely cure the MSSQ. This also allows the option to double apply the MSSQ to achieve a thicker polymer if desired.

MSSQ functions as a dielectric in the head, and may form a portion or all of, or be positioned between, many of the layers shown in FIG. 4. For example, the MSSQ can be positioned such that it surrounds at least two sides of the coils or heating element 438. Also, the first and/or second insulating layers 420, 430 in the head 400 of FIG. 4 can be MSSQ. Note however that MSSQ placement is not limited to positioning around the coils 418, 428, and can be positioned substantially in and/or outside the yoke, i.e., the greater portion of the layer of polymer is positioned in or outside the yoke. MSSQ can also form the upper spacing layer 424 between the two layers of coils 418, 428. Other noninclusive examples of MSSQ placement is below the lower shield layer 402, as the shield layer 408 between the lower shield layer 402 and the upper shield layer 404, between the upper shield layer 404 and lower pole 410, as the recording gap layer 422, and/or above the upper pole layer 432. Again, this list is noninclusive, and the MSSQ can be used in any desired combination. The important factor is to create a protruding effect, so the MSSQ can be positioned anywhere in head structure where it will carry the rest of head structure into the ABS.

FIGS. 7A–7I graphically depict an illustrative method of fabrication for a coplanar P1 pedestal and coil structure that will be planarized after inclusion of MSSQ as the inter-coil dielectric.

Figure 7A:
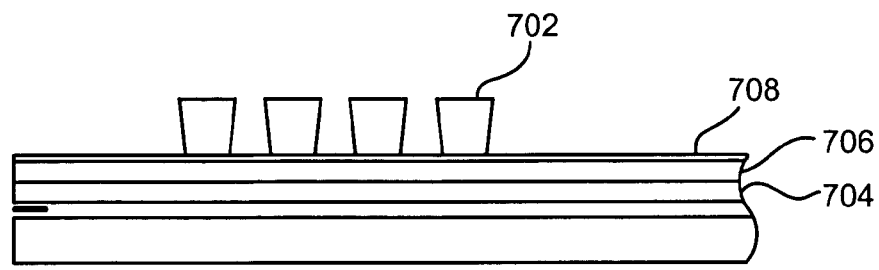
FIGS. 7A–7I graphically depict an illustrative method of fabrication for a coplanar P1 pedestal and coil structure according to one embodiment.

FIG. 7A illustrates formation of a coil conductor 702 on a lower pole 706. As shown, the head already has S2/P1 layers 704, 706 formed. Then a layer of alumina 708 is added to isolate processing above it to protect the P1 layer 706. A seed layer of copper (not shown) or other suitable material is added, and copper coils 702 are formed by plating. Then seed from between the coils 702 is removed, leaving the formed coils 702.

Figure 7B:
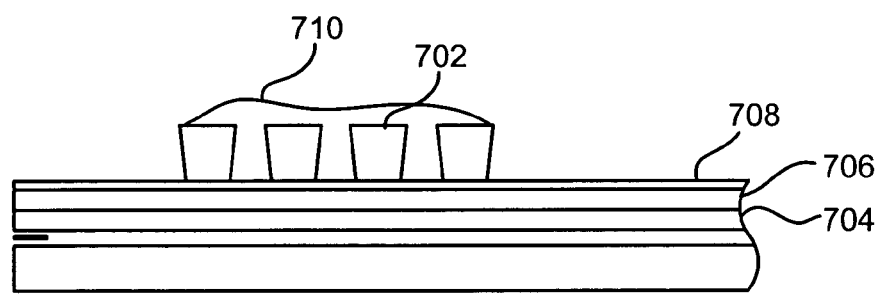

As shown in FIG. 7B, a layer of photoresist or hard bake 710 is added to the coils 702 to protect the coils 702 during further processing.

Figure 7C:
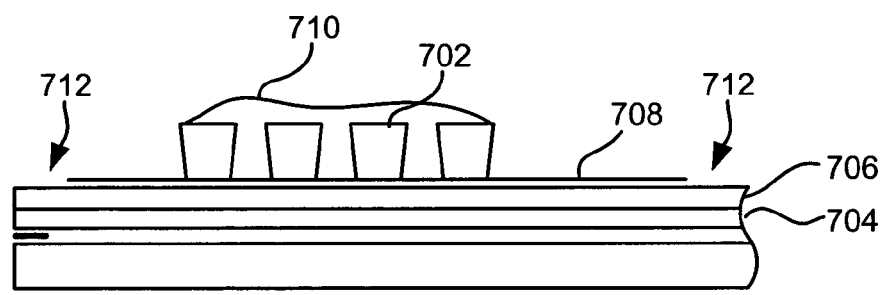

Referring to FIG. 7C, after the coils 702 are protected, vias 712 are etched into the layer of alumina 708 at the front and back of the structure. The vias 712 provide sites to which the P1P pole and back gap will be added.

Figure 7D:
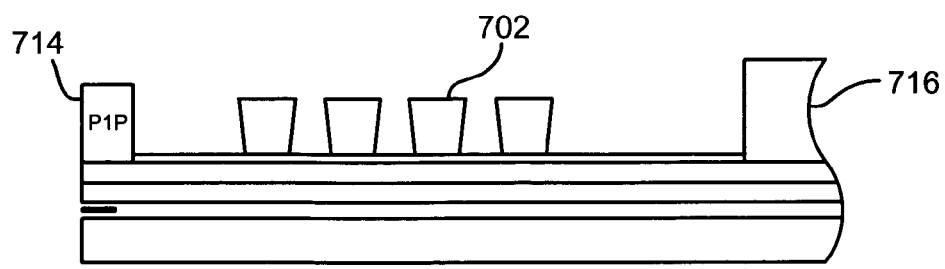

As shown in FIG. 7D, the hard bake 710 is removed by stripping it from the structure with oxygen-containing plasma, etc. This removes all of the polymer 710.

Figure 7E:
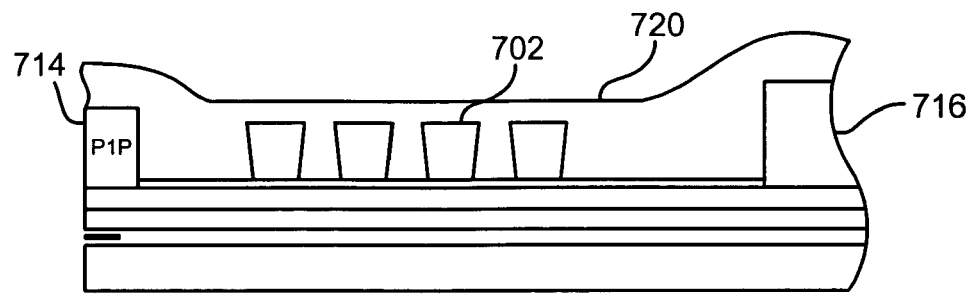

MSSQ 720 is added to the structure, as depicted in FIG. 7E. Spincoating is performed by spinning the wafer and then applying the material, which wicks across the surface in a thin uniform coating. This fills in all voids between the P1P pole 714 and back gap 716.

Chemical mechanical polishing (CMP) can then be used to planarize the structure to the desired height. The result is an encapsulated coil, as shown in FIG. 7I.

Figure 7F:
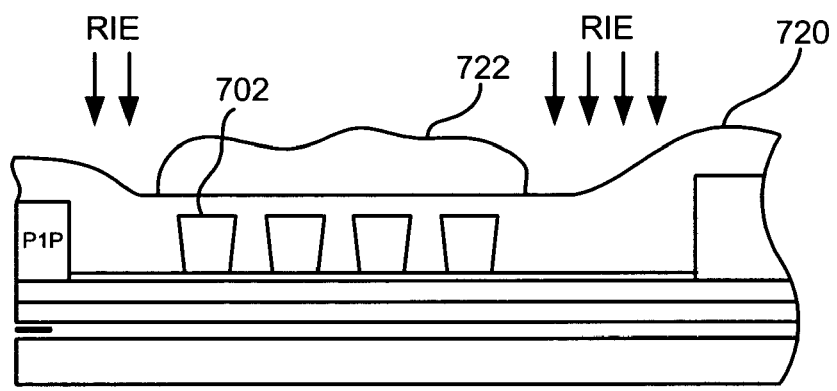
Figure 7G:
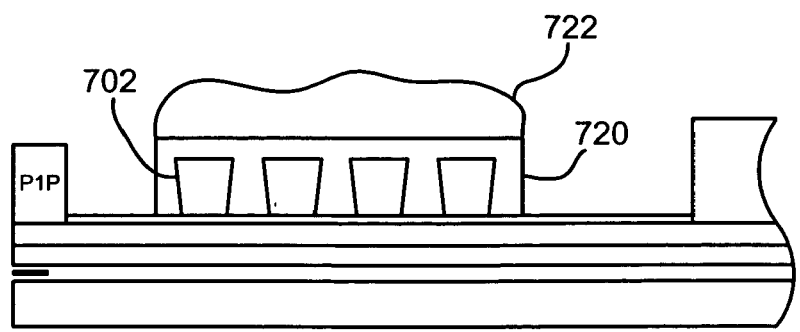

Referring to FIG. 7F, resist 722 is formed on the MSSQ 720 over the coils 702. Then reactive ion etching (RIE) processing is performed using Fluorine-containing plasma, or combination of these. This removes the MSSQ from the field, leaving an island of polymer covering the coils 702. The resulting structure is shown in FIG. 7G.

Figure 7H:
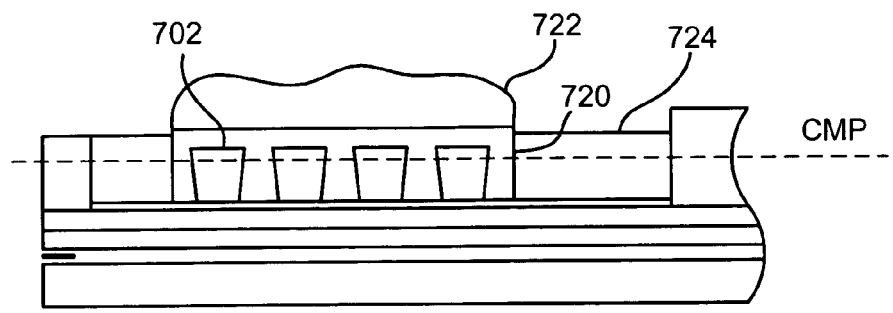
Figure 7I:
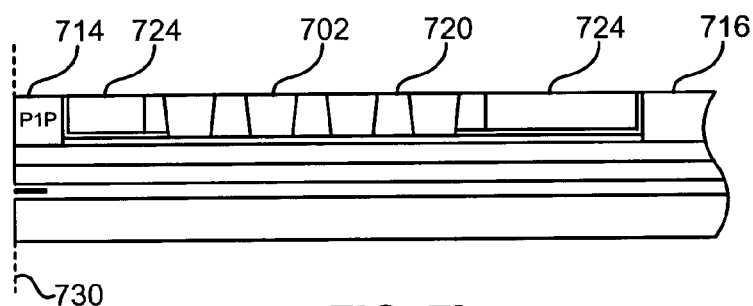

As shown in FIG. 7H, the field is filled with alumina 724. To provide even greater protrusion, MSSQ can be positioned in the field instead of alumina. Then the structure is processed by CMP processing to remove any material above coils 702. FIG. 7I depicts the final structure, with encapsulated coils 702.

As a side note, the MSSQ 720 could cover other or larger areas on the wafer. Also, it is preferred that the polymer not remain at the ABS plane 730 on the wafer. This polymer or other polymers may interfere with the head-disk interface (HDI).

FIGS. 8A–8E depict a method of forming a head with coils formed using a damascene process. This method produces a structure that retains all of the advantages of the structures described above and will produce a substantially similar coil structure.

Figure 8A:
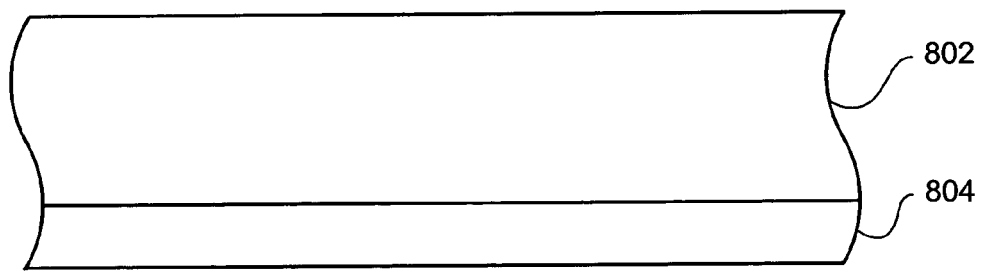
FIGS. 8A–8E graphically depict an illustrative method of forming a head with coils formed using a damascene process according to one embodiment.

FIG. 8A illustrates a portion of a head with a layer of MSSQ 802 formed fall film on a layer of alumina 804. To aid in understanding, the layer of alumina can be a layer such as the lower insulating layer 416 or the upper spacing layer 424 shown in FIG. 4.

Figure 8B:
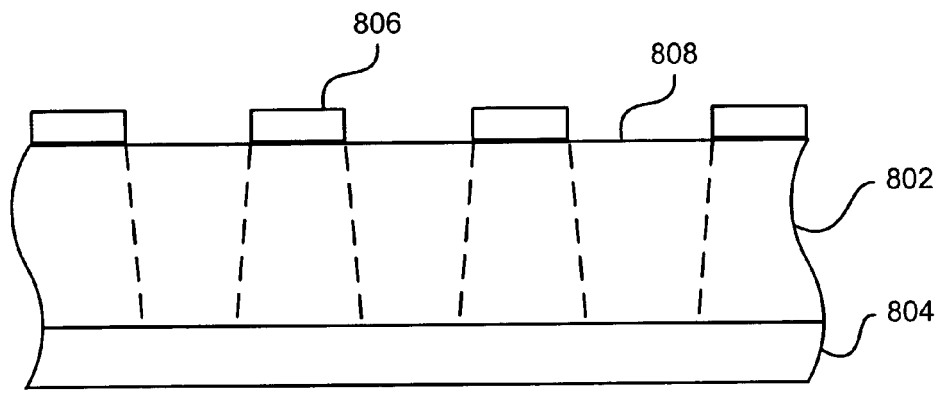

As shown in FIG. 8B, a RIE mask 806 is formed on the layer of MSSQ 802 via conventional processes to protect portions of the MSSQ 802 that will form insulators between the coils. The mask 806 can be a resist or other non-etchable material that is not totally consumed during subsequent processing. The dashed lines indicate the future location of trenches.

Figure 8C:
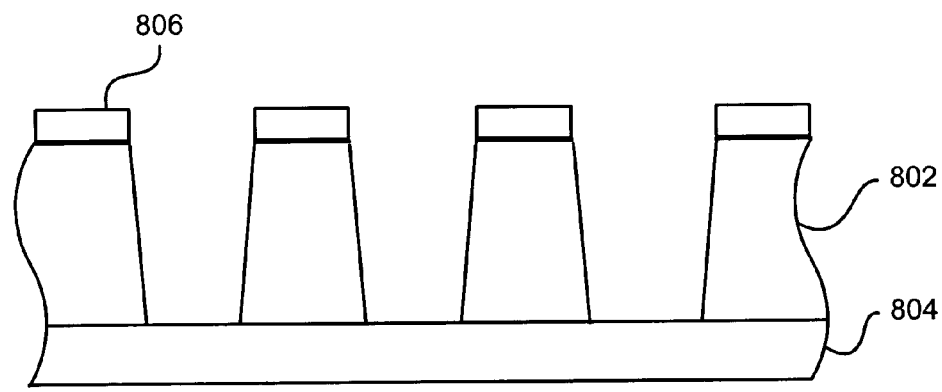

The exposed areas 808 of MSSQ 802 are removed using any suitable process, and preferably using a fluorine-containing plasma, resulting in the trenched structure shown in FIG. 8C. The mask 806 is then preferably removed.

Figure 8D:
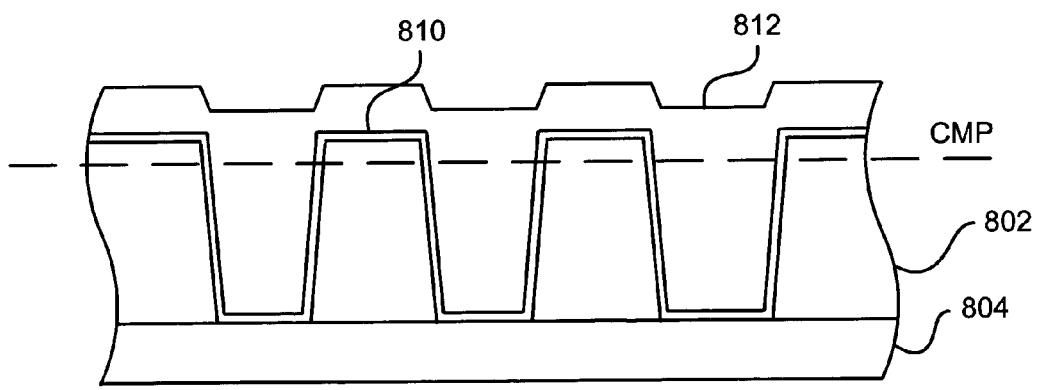
Figure 8E:
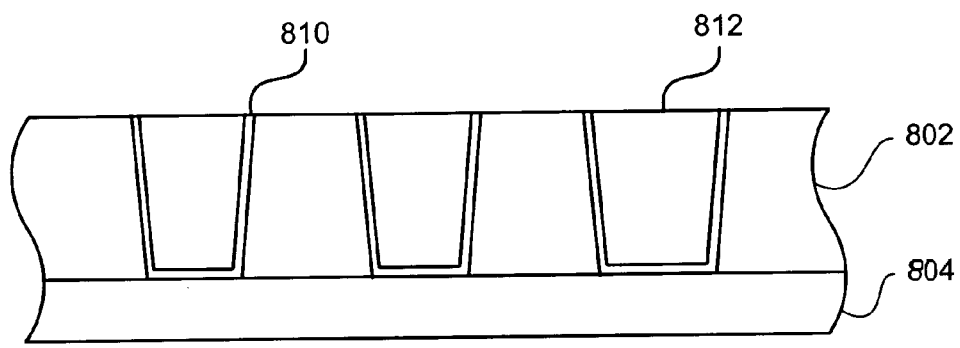

Referring to FIG. 8D, a seed layer 810 is added to the structure. Note that the seed layer may adhere to the walls of the trench and top surface of the MSSQ 802. The seed layer 810 can be, for example, Ta, Cu, etc. Then full film copper 812 or other electrically conductive material is plated to fill the trenches. CMP processing is performed to planarize the structure. FIG. 8E illustrates the final structure.

Note that many of the processing steps described above can be "mixed and matched" in any of the other processes, as will be understood by one skilled in the art.

Figure 9:
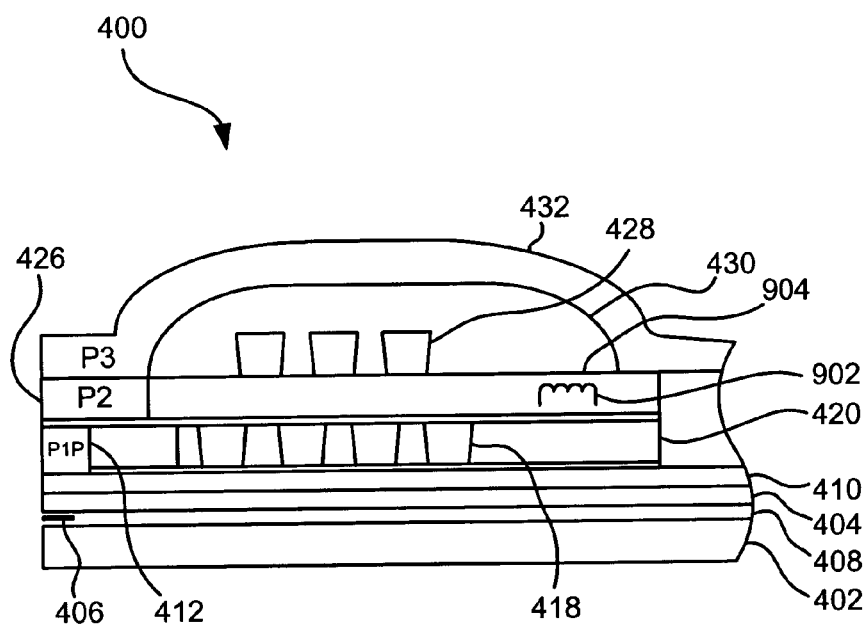
FIG. 9 illustrates an alternate placement of the heating element in the head of FIG. 4.

Other embodiments include creating a resistor surrounded at least on one side thereof by a large thermal expansion polymer to not only cause ABS protrusion by the write head but also by the read head. Similar variations could have the entire coil encapsulated with a large thermal expansion material. FIG. 9 illustrates the head 400 of FIG. 4 with the heating element 902 positioned to heat a layer of MSSQ 904. This causes enhanced protrusion in excess of that caused by coil heating.

A similar protrusion effect can be made by placing a resistor elsewhere in the head, such as in or above the yoke, below the read portion, in the slider, etc. In either case, a thermal expansion takes place which causes the head to protrude.

There has thus been described a new and novel head structure having controlled protrusion, thereby providing the following advantages:

A larger thermal expansion over all coil insulation between the pedestal and back gap in an inductive head More resistance to subsequent oxygen plasma exposure Can be planarized in a chemical-mechanical (CMP) polishing step Can be reactive ion etched (RIE) for damascene copper coils processing Insulation can withstand high temperature processing without the presence of acid in the insulation to interact with copper While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A method for increasing reliability during a read and/or write operation in a disk drive having a head, comprising:
   reading data from a disk using a head;
   measuring an amplitude of a signal obtained during reading the data;
   determining a degree of variation in the signal amplitude as a function of a position of the head relative to the disk; and
   selectively heating the head based on the variation in the signal amplitude for inducing protrusion of the head, thereby selectively reducing a fly height of the head.

2. A method as recited in claim 1, wherein the selective heating corresponds to the variation of the amplitude of the signal at various radial positions relative to the disk.

3. A method as recited in claim 1, wherein the degree of signal amplitude variation relates to variations in the fly height of the head over various portions of the disk.

4. A method as recited in claim 1, further comprising writing the data to the disk prior to reading the data from the disk.

5. A method as recited in claim 1, wherein the head is selectively heated for inducing protrusion of the head to a selected fly height at a particular radial position of the head with respect to the disk.

6. A method as recited in claim 5, wherein the fly height is selected based on an average fly height of the head over selected portions of the disk.

7. A method as recited in claim 1, wherein the signal amplitude variations are determined using a modulation detector.

8. A method as recited in claim 1, wherein the signal amplitude variations are determined by measuring a gain of the signal created by the head.

9. A method as recited in claim 1, wherein more heating is performed when the head is positioned towards an inner diameter of the disk.

10. A method as recited in claim 1, further comprising continuously varying an extent of the heating based on the variation in the signal amplitude.

11. A method as recited in claim 1, wherein the heating is constant during operation of the drive, wherein the protrusion is induced according to an extent of the heating.

12. A method for increasing reliability during a read and/or write operation in a disk drive having a head, comprising:
    writing data to a disk;
    reading the data from the disk using a head;
    measuring an amplitude of a signal obtained during reading the data;
    determining a degree of variation in the signal amplitude as a function of a position of the head relative to the disk; and
    selectively heating the head based on the variation in the signal amplitude for inducing protrusion of the head to a selected fly height at a particular radial position of the head with respect to the disk, the selective heating further including varying an extent of the heating;
    wherein the signal amplitude variations are determined either by using a modulation detector, or by measuring a gain of the signal created by the head.

13. A method as recited in claim 12, wherein the selective heating corresponds to the variation of the amplitude of the signal at various radial positions relative to the disk.

14. A method as recited in claim 12, wherein the degree of signal amplitude variation relates to variations in the fly height of the head over various portions of the disk.

15. A method as recited in claim 12, further comprising mapping fly height variations of the head relative to the disk based on the variation in the signal amplitude, and selectively heating the head at selected radial positions based on the fly height variations for inducing protrusion of the head, thereby selectively reducing a fly height of the head.

16. A method as recited in claim 12, wherein the fly height is selected based on an average fly height of the head over selected portions of the disk.

17. A method as recited in claim 12, wherein the heating includes heating a silicon-containing polymer in the head.

18. A method as recited in claim 17, wherein the silicon-containing polymer is only partially cured.

19. A method as recited in claim 12, wherein more heating is performed when the head is positioned towards an inner diameter of the disk.

20. A method as recited in claim 12, wherein the heating is constant during operation of the drive, wherein the protrusion is induced according to an extent of the heating.

21. A method for increasing reliability during a read and/or write operation in a disk drive having a head, comprising:
    mapping height variations of a surface of a disk; and
    selectively heating the head at selected radial positions based on the disk surface height variations for inducing protrusion of the head, thereby selectively reducing a fly height of the head.

22. A method as recited in claim 21, wherein the disk height variations are mapped using a modulation detector.

23. A method as recited in claim 21, wherein the disk height variations are mapped by measuring a gain of a read signal created by the head.

24. A method as recited in claim 21, wherein the disk height variations are mapped using a device that measures physical contours of the disk surface.

25. A method as recited in claim 21, wherein the selective heating corresponds to the variation of the amplitude of the signal at various radial positions relative to the disk.

26. A method as recited in claim 21, wherein the head is selectively heated for inducing protrusion of the head to a selected fly height at a particular radial position of the head with respect to the disk.

27. A method as recited in claim 26, wherein the fly height is selected based on an average fly height of the head over selected portions of the disk.

28. A method as recited in claim 21, wherein more heating is performed when the head is positioned towards an inner diameter of the disk.

29. A method as recited in claim 21, further comprising varying an extent of the heating based on the height variations of the disk.

30. A method as recited in claim 21, wherein the heating is constant during operation of the drive, wherein the protrusion is induced according to an extent of the heating.

31. A magnetic storage system, comprising:
    magnetic media;
    at least one head having a heater;
    a slider for supporting the at least one head; and
    a control unit coupled to the head for controlling operation of the head;
    wherein the magnetic storage system performs the method of claim 1.

32. A magnetic storage system, comprising:
    magnetic media;
    at least one head having a heater;
    a slider for supporting the at least one head; and
    a control unit coupled to the head for controlling operation of the head;
    wherein the magnetic storage system performs the method of claim 21.

* * * * *